United States Patent Office 2,884,145
Patented Apr. 28, 1959

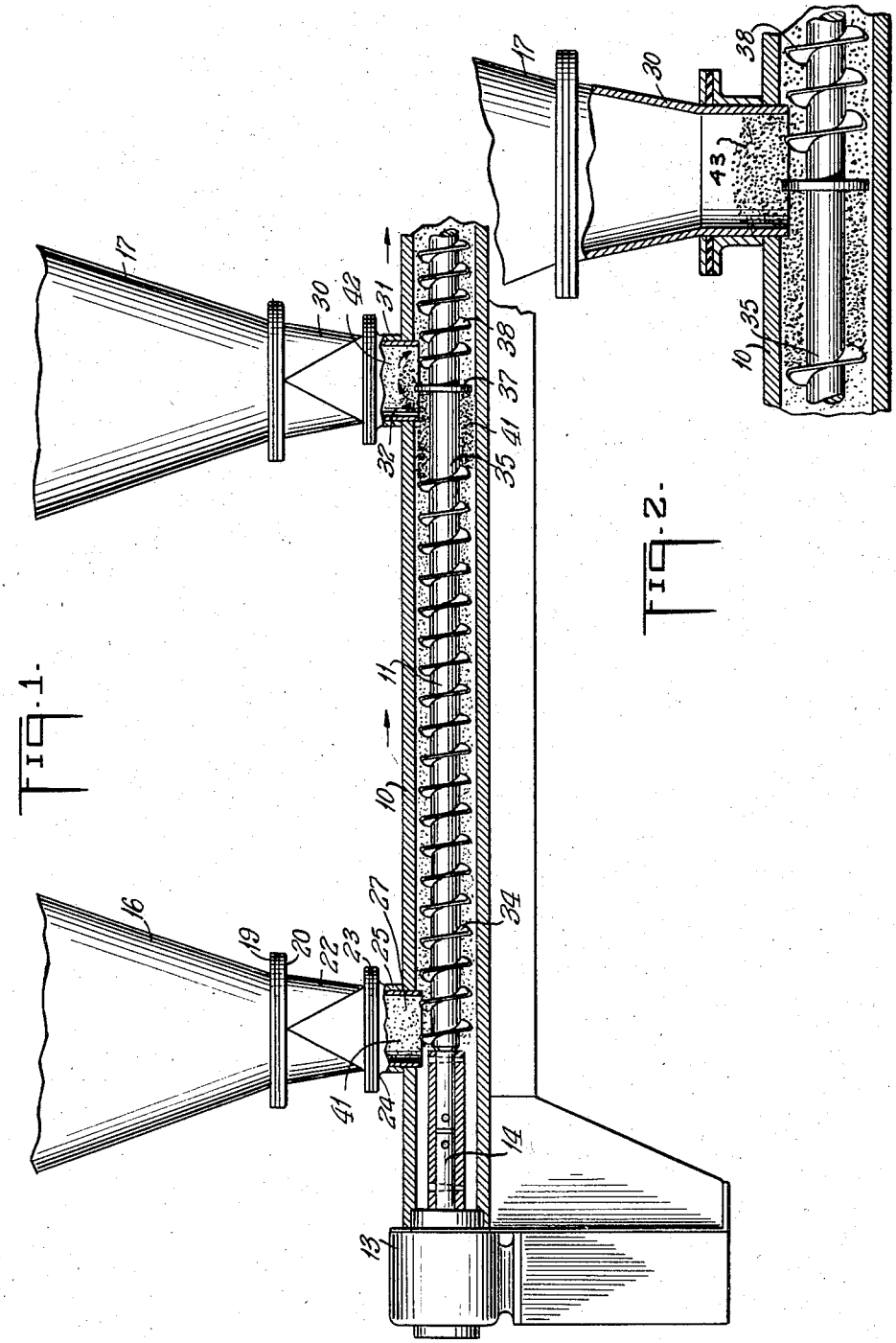

2,884,145

SCREW CONVEYOR APPARATUS

Franz Müller, Refrath, Bezirk Koln, and Leonhard H. Winners, Koln-Kalk, Germany, assignors to Klockner-Humboldt-Deutz A.G., Koln (Rhine), Germany, a German corporation Application May 29, 1956, Serial No. 588,180

8 Claims. (Cl. 214—17)

The present invention relates to a conveyor for fine-grained pulverized material and to the maintaining of a gas-pressure seal for the supply means of the conveyor; and, more particularly, the invention relates to a screw conveyor for conveying fine-grained pulverized material from a plurality of hoppers or supply vessels, while continuously maintaining a gas-pressure seal among the several supply vessels each with respect to the other, and also with respect to the atmosphere.

The present application is a continuation in part of our copending application, Serial No. 260,554, filed December 7, 1951, now abandoned.

It is a principal object of the present invention to provide a screw conveyor of this character wherein the gas pressure seal will be maintained notwithstanding the fact that one or more of the several supply vessels may have become empty.

The screw conveyor in accordance with the invention comprises a horizontally elongated power-driven shaft which extends within a tubular pipe or duct coaxially therewith. At a plurality of points along the duct, longitudinally spaced supply apertures are formed therein in the upper side thereof. Each supply aperture communicates with a bin, hopper or similar supply vessel from which pulverized material is fed by gravity into the conveyor duct. Extending within the duct and past these several supply apertures is a helical conveyor member mounted on the shaft and which feeds the pulverized material from the most upstream of the supply apertures and past one or more intermediate supply apertures to the conveyor outlet. The conveyor helix is interrupted upstream of each of the supply apertures intermediate the most upstream aperture and the conveyor outlet. This interruption of the conveyor helix leaves an intervening bare or smooth portion of the rotating shaft around which the pulverized material accumulates upstream of each intermediate supply aperture thereby forming a gas-tight pressure seal of compact material. The interruption terminates at its downstream end in a circular disc or dam fixed to the shaft, each disc being located in communication with one of the intermediate supply apertures. The pulverized material is thus constrained to move upwardly into and out of each intermediate supply aperture in order to surmount and flow over each revolving disc or dam. If the supply of material at any intermediate aperture should become exhausted, material from any aperture located upstream of the aperture for which the supply is exhausted will move up into and down out of the exhausted supply duct thereby forming and maintaining a sealing plug of pulverized material directly above the exhausted supply aperture. This sealing plug of pulverized material maintains a gas seal notwithstanding the fact that the duct in which it is formed would otherwise be empty. When a fresh suply of material becomes available at the exhausted supply aperture, the weight of the new material will cause it to flow downwardly by gravity into the supply aperture as before, so that the pulverized material is again fed to the conveyor along with material from any supply duct located upstream thereof.

If the most upstream supply vessel should become exhausted, the pressure seal is maintained by a tubular plug of pulverized material surrounding the bare portion of the shaft immediately upstream of the next supply aperture.

Various additional objects, features and advantages of the invention will become apparent upon reading the following specification together with the accompanying drawing forming a part hereof.

Referring to the drawing—

Fig. 1 is a view in side elevation illustrating an embodiment of a screw conveyor in accordance with the invention, the conveyor being shown in longitudinal section.

Fig. 2 is an enlarged fragmentary view showing the sealing plug which is formed at an exhausted supply aperture.

Referring to Fig. 1, the conveyor comprises an elongated tubular duct 10. A conveyor shaft 11 extends coaxially within the duct 10. At its left-hand end, the shaft 11 is connected to drive means, illustratively shown as an electric motor 13, by means of a coupling 14. Two supply vessels such as hoppers 16 and 17 are illustrated, only their lower conical ends being visible in the drawing.

At its lower end, the hopper 16 terminates in a collar flange 19 which is connected to a flange 20 formed on the upper end of an inlet duct member 22. Inlet duct member 22 is provided with a lower flange member 23. Lower flange 23 is connected to a cooperating flange 24, formed on an upstream inlet member 25. The upstream inlet member 25 is mounted in the wall of the elongated tubular duct 10 and defines a most upstream port or inlet aperture 27.

The downstream hopper 17 is similarly connected through a flanged inlet duct member 30 to a downstream inlet member 31 which defines a downstream port or inlet aperture 32.

Mounted on the shaft 11 is a helical conveyor member or helix 34. The conveyor helix 34 is fixed to shaft 11 for rotation therewith. The conveyor helix 34 extends from a position beneath the upstream inlet aperture 27 to a terminal point 35 located upstream of the downstream inlet aperture 32.

A disc or collar 37 is mounted on shaft 11 for rotation therewith at a central position directly beneath the downstream inlet aperture 32 intermediate its upstream and downstream edges so that the inlet aperture 32 communicates with both sides of the disc 37. A smooth portion of shaft 11 extends from terminal point 35 to disc 37. A further helical conveyor member or helix 38 extends downstream from the disc 37. If one or more additional downstream inlet apertures are provided, then the conveyor helix 38 will terminate upstream of the next aperture in a manner similar to the helix 34 which terminates at point 35. Similarly, a disc will be provided at each further downstream inlet aperture. If no further downstream inlet apertures are provided, then the helix 38 will extend continuously to the conveyor outlet (not shown).

In operation, the motor 13 drives the shaft 11 through coupling 14. Shaft 11 rotates in a counterclockwise direction as viewed from the left of Fig. 1. As a result, pulverized material 41 which is fed downwardly by gravity from hopper 16 will be conveyed to the right within the duct 10 until it reaches the terminal point 35 at the right-hand end of the conveyor helix 34. Downstream of terminal point 35, the material 41 from hopper 16 accumulates and compacts around the smooth portion of shaft 11 and forms a gas-tight pressure seal due to the absence of the conveying helix 34 which terminates at point 35 and does not extend along this portion of the shaft 11 and because of the additional impediment to the flow of material in that the pulverized material 41 must rise over and surmount the disc 37 in order to reach the next conveyor member 38. In so doing, the material 41 is constrained to move upwardly into the downstream inlet member 31 where it merges with further pulverized material 42 flowing downwardly by gravity through the right-hand portion of the downstream inlet member 31.

In the event that the supply of pulverized material 42 from the downstream hopper 17 should become exhausted as shown in Fig. 2, the material 41 from the upstream hopper 16 will nevertheless continue to flow over the disc 37. In flowing over disc 37, it will move upwardly into the downstream inlet member 31 and may extend upwardly into the flanged duct member 30, forming a second sealing plug 43 to assist the gas pressure seals formed in the conveyor duct 10. When a new supply of pulverized material becomes available in the hopper 17, it will again move downwardly by gravity through the downstream inlet member 31 and merge with the material flowing over disc 37 in the same manner as it did prior to interruption of the downstream supply in hopper 17.

If the supply of pulverized material 41 in the upstream hopper 16 should become exhausted so that no material is available at the most upstream inlet aperture 27, then the gas-tight seal is maintained by the tubular plug of pulverized material which surrounds the non-conveying section of shaft 11 in the space between the downstream terminus of helix member 34 at point 35 and the upstream side of disc 37.

While there have been shown and described what are believed to be the best embodiments of the invention, it will be apparent to those skilled in the art that many modifications may be made therein within the spirit and scope of the invention as defined in the appended claims.

We claim:

1. Screw conveyor apparatus of the class described comprising a drive shaft having a direction at least the major component of which is horizontal, a helical member mounted on said shaft for rotation therewith and pitched to convey material downstream therealong, said shaft extending beyond the downstream end of the helical member, a casing extending along said shaft coaxially therewith and confining the shaft and helical member, said casing having a least a first and a second opening therein, supply means communicating with said casing through said first and second openings, and a disc in said casing and mounted on said shaft downstream of the helical member and adjacent said second opening, whereby material must flow upwardly over said disc to merge with material entering through said second opening of said casing.

2. Screw conveyor apparatus of the class described comprising a revolvably driven shaft having a substantial horizontal component of direction, a helix member mounted on said shaft for rotation therewith and pitched to convey material downstream therealong, said shaft extending beyond the downstream end of the helical member, a casing extending along said shaft coaxially therewith and confining the said shaft and helix member, an upstream aperture in said casing, a material supply vessel communicating with said upstream aperture, a downstream aperture in said casing, said downstream aperture also serving as a material inlet and being vertically disposed above a portion of the extension of said shaft beyond said helical member, and a disc in said casing and mounted on said shaft extension for rotation therewith on the portion beneath the said downstream aperture.

3. Screw conveyor apparatus of the class described comprising a revolvably driven shaft having a substantial horizontal component of direction, a first helix member mounted on said shaft for rotation therewith and pitched to convey pulverized material downstream therealong, a second helix member mounted on said shaft downstream of said first helix member, the upstream end of said second helix member being axially spaced from the downstream end of said first helix member, an upwardly-downwardly extending circular dam mounted on said shaft between the proximal ends of the first and second helix members, a duct extending along said shaft coaxially therewith and confining said first and second helix members and said shaft, said duct having at least one aperture for supplying material to the first helix substantially upstream of the downstream end of said first helix, said duct having a port communicating with both sides of the dam, and a material-supply conduit communicating with said port, the material moved by said first helix member flowing upwardly over said dam to merge with material entering through said port.

4. Screw conveyor apparatus of the class described comprising a revoluble power-driven shaft having a substantial horizontal component of direction, a first conveyor helix member mounted on said shaft for rotation therewith and pitched to convey pulverized material downstream therealong, a second conveyor helix member mounted on said shaft downstream of said first helix member, the upstream end of said second helix member being axially spaced from the downstream end of said first helix member, an upwardly-downwardly extending circular dam mounted on said shaft at the upstream end of said helix member, a tubular duct extending along said shaft coaxially therewith and surrounding said first and second helix members, said duct having a first supply aperture formed therein communicating with the upstream region of said first helix member, said duct further having a second supply aperture formed therein communicating with both sides of said dam, a supply duct for pulverized material communicating individually with said first aperture and a further supply duct for pulverized material communicating individually with said second aperture.

5. Screw conveyor apparatus of the class described comprising a horizontally elongated revoluble power-driven shaft, a first conveyor helix member mounted on said shaft for rotation therewith and pitched to convey pulverized material downstream therealong, a second conveyor helix member mounted on said shaft downstream of said first helix member, the upstream end of said second helix member being axially spaced from the downstream end of said first helix member to leave an intermediate section of said shaft between said first and second helix members which is inactive for conveying purposes, a circular dam mounted on said shaft in advance and defining the downstream boundary of said intermediate section of said second helix member, a tubular duct extending along said shaft coaxially therewith and surrounding said first and second helix members including said space therebetween, a first supply vessel for pulverized material disposed above said tubular duct, a first supply duct connecting said first supply vessel with the interior of said tubular duct at the upstream region of said first helix member, a second supply vessel for pulverized material disposed above said tubular duct, and a second supply duct connected with said second supply vessel and communicating with the interior of said tubular duct at both sides of said dam.

6. Screw conveyor apparatus of the class described for conveying pulverized material, said apparatus comprising a revoluble power-driven shaft, a first conveyor helix mounted on said shaft for rotation therewith, a second conveyor helix mounted on said shaft downstream of said first helix, both helices being pitched to convey pulverized material downstream along the shaft, the upstream end of said second helix being axially spaced from the downstream end of said first helix to leave an intermediate material sealing section of said shaft extending therebetween, a circular disc of diameter at least as great as the diameter of said second helix disposed on said shaft at the upstream end of said second helix, a tubular duct extending along said shaft coaxially therewith and closely surrounding said first and second helices for confining said pulverized material, said duct having a first supply aperture formed therein communicating with the upstream region of said first helix, said duct further having a second supply aperture formed therein communicating with both sides of said dam, and supply ducts for said pulverized material communicating individually with each of said apertures.

7. Screw conveyor apparatus of the class described comprising a substantially horizontal revoluble power-driven shaft, a first conveyor helix member mounted on said shaft for rotation therewith, a second conveyor helix member mounted on said shaft downstream of said first helix member, both helices being pitched to convey pulverized material downstream along the shaft, the upstream end of said second helix member being axially spaced from the downstream end of said first helix member, a circular dam concentrically fixed to said shaft for rotation therewith at the upstream end of said second helix member, a duct extending along said shaft coaxially therewith and surrounding said first and second helix members and said space therebetween, said duct having a first supply aperture formed therein communicating with the upstream region of said first helix member, said duct further having a second supply aperture formed therein communicating with both sides of said dam, a supply duct for pulverized material communicating individually with said first aperture and a further supply duct for pulverized material communicating individually with said second aperture, the material moved by the first helix member flowing upwardly over said dam to merge with material entering said second aperture.

8. Screw conveyor apparatus of the class described comprising a horizontally elongated revoluble shaft, a first conveyor helix member mounted on said shaft for rotation therewith and pitched to convey pulverized material downstream therealong, a second conveyor helix member fixed to said shaft for rotation therewith downstream of said first helix member, said second helix member being pitched like said first helix member, the upstream end of said second helix member being axially spaced from the downstream end of said first helix member to leave a non-conveying section of said shaft therebetween, a circular dam of diameter at least as great as the external diameter of said second helix member concentrically mounted on said shaft abutting the upstream end of said second helix member, said dam being fixed to said shaft for rotation therewith, a tubular duct extending along said shaft coaxially therewith and surrounding said first and second helix members, a first supply vessel for pulverized material disposed above said tubular duct, a first supply duct connecting said first supply vessel with the interior of said tubular duct at the upstream region of said first helix member, a second supply vessel for pulverized material disposed above said tubular duct, a second supply duct connected with said second supply vessel and communicating with the interior of said tubular duct at both sides of said dam, and power-operated means connected to said shaft for revolving said helix members and said dam.

References Cited in the file of this patent

UNITED STATES PATENTS

| 2,021,991 | Depew | Nov. 26, 1935 |
| 2,176,092 | Meduna | Oct. 17, 1939 |

FOREIGN PATENTS

| 1,061,705 | France | Dec. 2, 1953 |
| 1,070,281 | France | Feb. 17, 1954 |